(12) United States Patent
Jordan

(10) Patent No.: US 11,866,934 B1
(45) Date of Patent: Jan. 9, 2024

(54) METHOD FOR INSULATING PIER AND BEAM HISTORIC FOUNDATIONS

(71) Applicant: Joshua Julian Jordan, Arlington, TX (US)

(72) Inventor: Joshua Julian Jordan, Arlington, TX (US)

( * ) Notice: Subject to any disclaimer, the term of this patent is extended or adjusted under 35 U.S.C. 154(b) by 0 days.

(21) Appl. No.: 17/736,841

(22) Filed: May 4, 2022

Related U.S. Application Data

(60) Provisional application No. 63/183,987, filed on May 4, 2021.

(51) Int. Cl.
*E04B 2/74* (2006.01)
*E04B 1/78* (2006.01)

(52) U.S. Cl.
CPC ............. *E04B 2/7412* (2013.01); *E04B 1/78* (2013.01)

(58) Field of Classification Search
CPC ................................ E04B 2/7412; E04B 1/78
See application file for complete search history.

(56) References Cited

U.S. PATENT DOCUMENTS

| | | | | |
|---|---|---|---|---|
| 1,852,917 A * | 4/1932 | Burgett | ..................... | E04C 3/02 52/696 |
| 4,292,777 A * | 10/1981 | Story | ..................... | E04D 13/172 52/742.13 |
| 4,856,247 A * | 8/1989 | Georgino | ..................... | E04B 1/7666 52/404.3 |
| 5,678,371 A * | 10/1997 | Wills | ..................... | E04B 1/0007 52/407.3 |
| 6,557,313 B1 * | 5/2003 | Alderman | ..................... | E04B 1/7662 52/407.3 |
| 9,091,377 B2 * | 7/2015 | Lechuga | ..................... | F16L 13/141 |
| 9,481,995 B2 * | 11/2016 | Bemis | ..................... | E04C 2/205 |
| 9,745,739 B2 * | 8/2017 | Riepe | ..................... | E04B 1/4178 |
| 10,385,566 B2 * | 8/2019 | Carlson | ..................... | E04B 2/707 |
| 2004/0000112 A1 * | 1/2004 | Alderman | ..................... | E04B 1/767 52/407.3 |
| 2004/0163345 A1 * | 8/2004 | Alderman | ..................... | B32B 29/02 52/406.1 |
| 2009/0126302 A1 * | 5/2009 | Thomas | ..................... | E04B 5/00 52/407.3 |
| 2011/0203201 A1 * | 8/2011 | Lechuga | ..................... | F16L 5/02 52/220.1 |
| 2015/0240483 A1 * | 8/2015 | Riepe | ..................... | E04B 1/7604 52/309.12 |
| 2016/0244963 A1 * | 8/2016 | Bemis | ..................... | E04D 13/1668 |
| 2019/0085557 A1 * | 3/2019 | Carlson | ..................... | E04B 2/821 |
| 2019/0093341 A1 * | 3/2019 | Ndobo-Epoy | ..................... | E04B 1/767 |

* cited by examiner

*Primary Examiner* — Rodney Mintz
(74) *Attorney, Agent, or Firm* — Plager Schack LLP; Mark H. Plager; Kara Verryt

(57) ABSTRACT

A method for insulating a pier and beam foundation on a structure, wherein the pier and beam foundation includes at least one floor joist, at least one pier, at least one beam, a side skirt, flooring, and plumbing including at least one pipe, may include applying a synthetic underlayment to the at least one floor joist and to a bottom surface of the flooring; laying a radiant insulation board end-to-end across the at least one floor joist, over the synthetic underlayment, and along the side skirt; and applying a tape to adjacent radiant insulation boards to seal joints there between. The method may also include wrapping the at least one pipe with spray foam, a foam pipe insulator, and duct tape.

8 Claims, 2 Drawing Sheets

METHOD FOR INSULATING PIER AND BEAM HISTORIC FOUNDATIONS

RELATED APPLICATION

This application claims priority to provisional patent application U.S. Ser. No. 63/183,967 filed on May 4, 2021, the entire contents of which is herein incorporated by reference.

BACKGROUND

The embodiments described herein relate generally to construction methods and, more particularly, to a method for insulating pier and beam historic foundations.

Historic pier and beam foundations are not sealed off. Rather, they include floor joist laid 16 inches apart on beams, and then hardwood floor planks are laid over the floor joist. Because of this, these historic houses have very little, if any, sound protection. They also do not retain heat well in the winter and tend to overheat in the summer. Lastly, these houses do not have sufficient protection against pest infestation.

There are currently no existing systems or methods for creating a water and acoustic barrier and for sealing off and creating dead air space in a pier and beam foundation. If pier and beam foundations could have a water and acoustic barrier, energy costs would be lowered, the home would be less drafty, pipes may be prevented from freezing, and pest may be kept out of the home better.

Therefore, what is needed is a method for insulating pier and beam historic foundations.

SUMMARY

Some embodiments of the present disclosure include a method for insulating a pier and beam foundation on a structure, wherein the pier and beam foundation includes at least one floor joist, at least one pier, at least one beam, a side skirt, flooring, and plumbing comprising at least one pipe. The method may include applying a synthetic underlayment to the at least one floor joist and to a bottom surface of the flooring; laying a radiant insulation board end-to-end across the at least one floor joist, over the synthetic underlayment, and along the side skirt; and applying a tape to adjacent radiant insulation boards to seal joints there between. The method may also include wrapping the at least one pipe with spray foam, a foam pipe insulator, and duct tape.

BRIEF DESCRIPTION OF THE FIGURES

The detailed description of some embodiments of the invention is made below with reference to the accompanying figures, wherein like numerals represent corresponding parts of the figures.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

The method of the present disclosure may be used to insulate pier and beam houses and may comprise the following elements. This list of possible constituent elements is intended to be exemplary only, and it is not intended that this list be used to limit the method of the present application to just these elements. Persons having ordinary skill in the art relevant to the present disclosure may understand there to be equivalent elements that may be substituted within the present disclosure without changing the essential function or operation of the method.

The various elements of the present disclosure may be related in the following exemplary fashion. It is not intended to limit the scope or nature of the relationships between the various elements, and the following examples are presented as illustrative examples only.

Figure 1:
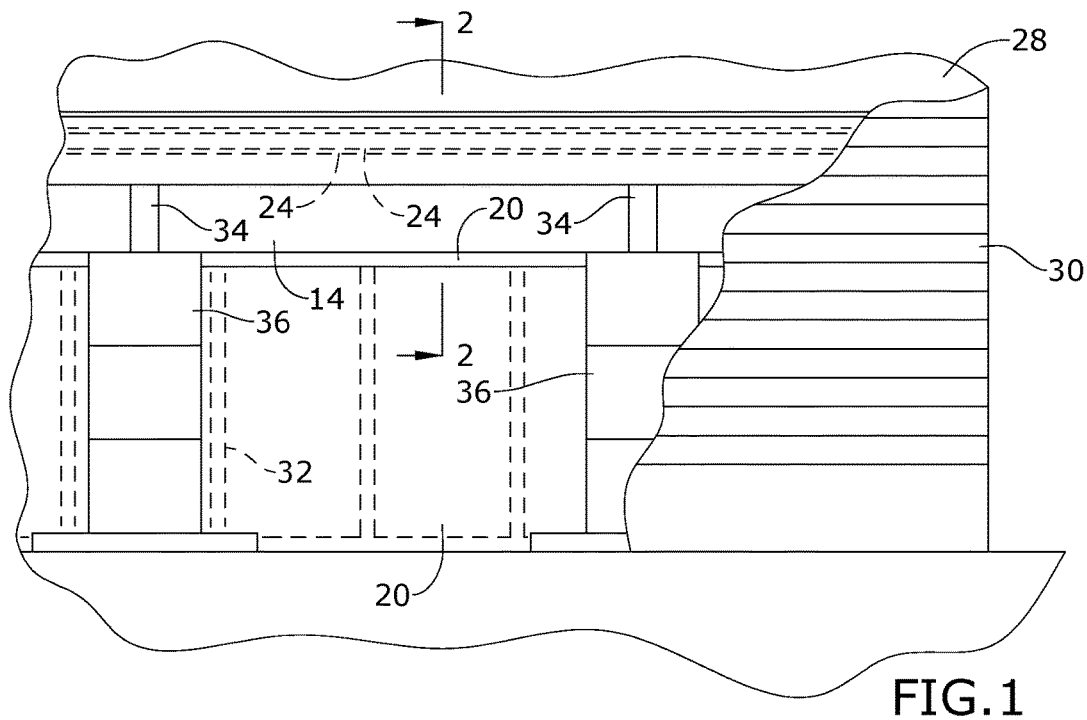
FIG. 1 is a schematic side view of one embodiment of the present disclosure.
Figure 2:
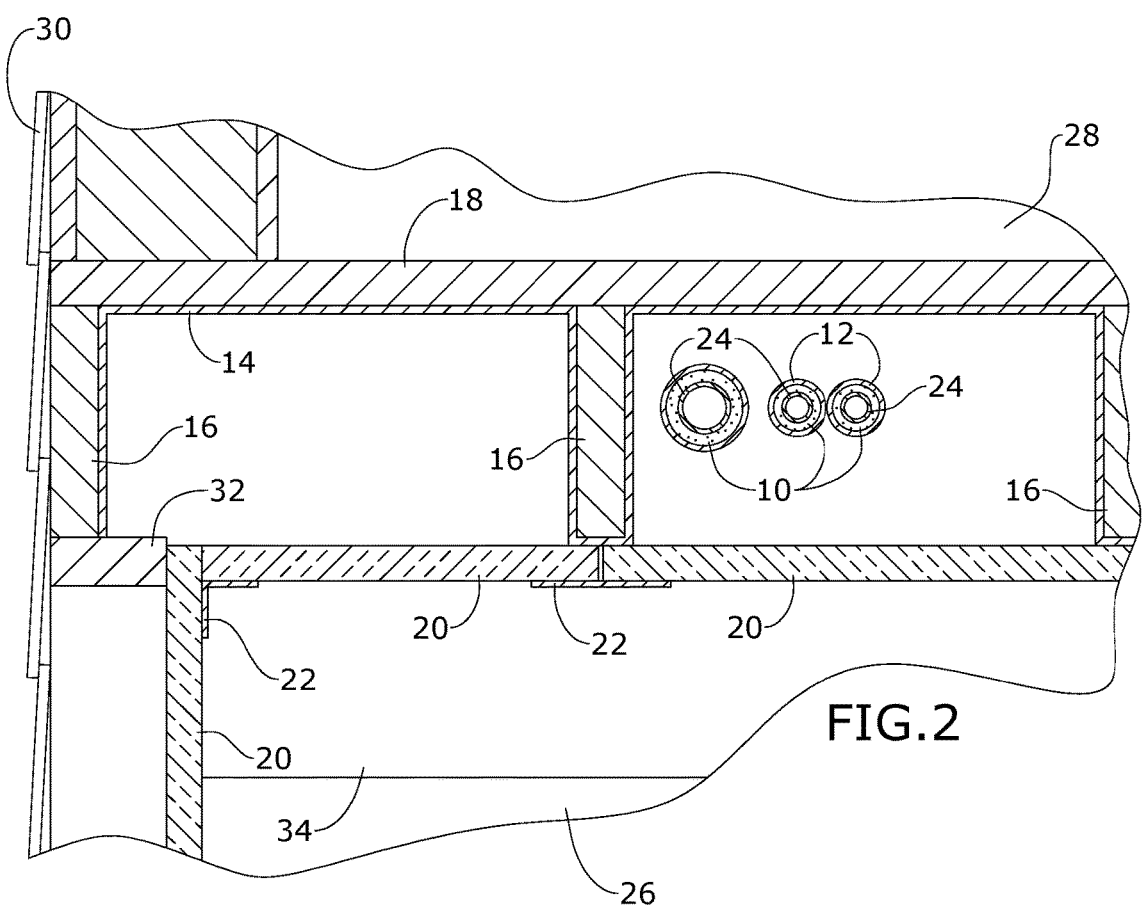
FIG. 2 is a section view of one embodiment of the present disclosure, taken along line 2-2 in FIG. 1.
Figure 3:
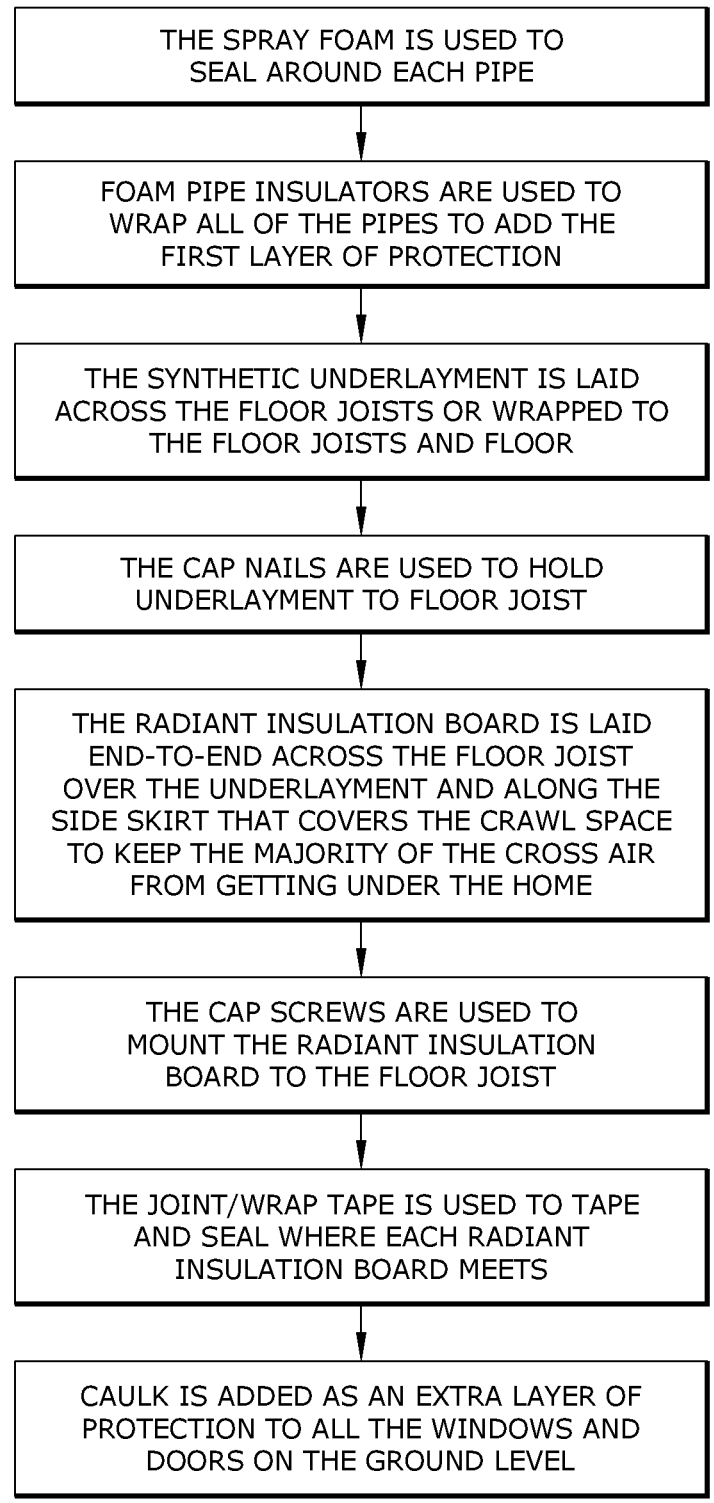
FIG. 3 is a flow chart explaining an embodiment of the present disclosure.

By way of example, and referring to FIGS. 1-3, some embodiments of the present disclosure include a method for insulating a pier and beam foundation, the method comprising building a water barrier and an acoustic barrier to seal off the pier and beam foundation and floor joists. Insulating the foundation using the method of the present disclosure may lower energy costs, make the building less drafty, prevent pipes from freezing, and help keep the building pest-free.

Traditionally, pier and beam foundations include a plurality of piers 36 that support intersecting beams 34 such that a crawl space 26 exists between the ground surface and the beams 34. Floor joists 16 may extend upwards from the beams 34, wherein a flooring 18, such as hardwood flooring, may be placed or laid across the floor joists 16. The foundation may be enclosed within the interior 28 of a structure, such that an outer wall 30 of the structure may prevent access to the foundation from outside of the structure. Traditionally, plumbing and pipes 24 for the structure are run between the beams 34 and the flooring 18 and between adjacent floor joists 16. In embodiments, a side skirt 32 may extend outward from outer edges of the beams 34 to cover the crawl space 26 to prevent cross air from getting under the home.

In embodiments, the method of the present disclosure may include using one or more layers to waterproof and create an acoustic and pest barrier, wherein the layers may comprise mostly green products that do not lose their R rating, which is the measurement of a material's capacity to resist heat flow from one side to the other.

Specifically, and as described in FIG. 3, the method of the present disclosure may comprise applying a spray foam 10 around each pipe 24 to create a seal around each pipe 24; wrapping a foam pipe insulator 12 around each pipe 24, such that the spray foam 10 is sandwiched between the pipe 24 and the foam pipe insulator 12, thus creating a first layer of protection; laying or wrapping a synthetic underlayment 14, such as PALISADE brand synthetic underlayment, across the floor joists 16 and flooring 18; laying a radiant insulation board 20 end-to-end across the floor joist 16, over the underlayment 14, and along the side skirt 32; applying a tape 22, such as SHURTAPE brand tape, to adjacent radiant insulation boards 20 to seal joints there between; and adding a layer of caulk to window and door joints on the ground level.

In some embodiments, the method may further comprise wrapping the pipes 24 and foam pipe insulator 12 with commercial duct tape. Moreover, the method may also comprise sealing the location where the pipes 24 meet the flooring 18 using a spray foam or silicone. In embodiments, the radiant insulation board 20 may be placed vertically behind the side skirt 32.

In embodiments, the synthetic underlayment 14 may be held in place using any conventional or known fastener and, in a particular embodiment, the underlayment 14 may be attached to the floor joists 16 using cap nails or staples. Similarly, any suitable fastener may be used to attach the radiant insulation board 20 to the floor joists 16 and, in a particular embodiment, the radiant insulation board 20 may be attached to the floor joists 16 using cap screws. The radiant insulation board 20 may comprise any suitable insulation board and, in some embodiments, comprises SILVERBOARD brand board insulation.

In some embodiments, the method may include not only laying the synthetic underlayment 14 from floor joist 16 to floor joist 16, but also wrapping each floor joist 16 and between each floor joist 16 with the underlayment 14. Additionally, the radiant insulation board 20 may also be placed between the floor joists 16 and butting up against the sub floor or flooring 18.

The method helps soundproof pier and beam and historic foundations by providing multiple layers of protection from the outside elements. The method helps keep dust, pest, and varmints out of the structure, while keeping the structure warmer in the winter and cooler in the summer. Applying the synthetic underlayment 14 may create a very durable and waterproof barrier, wherein applying the underlayment 14 may include wrapping each floor joist 16 and the subfloor, when present. Using the tape to seal the joints may help prevent water, air, and pests from getting into the foundation. More specifically, the method of the present disclosure creates a watertight layer between the outside and the subfloor and, thus, if a water burst or leak happens the sealed sub floor would be protected from water spraying on it. Moreover, using the method of the present disclosure may also help keep allergens out of the house, which could reduce medical and health care costs.

Because the method of the present disclosure helps better insulate pier and beam foundations, energy consumption may be reduced, thus causing less pollution.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A method of insulating a pier and beam foundation on an existing structure, wherein the pier and beam foundation comprises a plurality of floor joists, at least one pier, at least one beam, a side skirt, flooring, and plumbing comprising at least one pipe, the method comprising:
   attaching a synthetic underlayment directly to the plurality of floor joists and to a bottom surface of the flooring such that an entirety of the synthetic underlayment is coextensively positioned over and directly contacts the plurality of floor joists and the bottom surface of the flooring;
   attaching a plurality of radiant insulation boards end-to-end across the plurality of floor joists, over the synthetic underlayment, and along the side skirt, thereby enclosing the pier and beam foundation; and
   applying a tape to adjacent said radiant insulation boards to seal joints there between.

2. The method of claim 1, further comprising sealing where the at least one pipe meets the flooring using a member selected from the group consisting of spray foam and silicone.

3. The method of claim 1, further comprising adding a layer of caulk to window and door joints in the structure.

4. The method of claim 1, wherein the synthetic underlayment is attached to the plurality of floor joists and to the bottom surface of the flooring using cap nails.

5. The method of claim 1, wherein the plurality of radiant insulation boards is attached to the plurality of floor joists using cap screws.

6. The method of claim 1, further comprising applying a spray foam around the at least one pipe.

7. The method of claim 6, further comprising wrapping a foam pipe insulator around the at least one pipe such that the spray foam is sandwiched between the at least one pipe and the foam pipe insulator.

8. The method of claim 7, further comprising wrapping duct tape around an exterior of the foam pipe insulator.

\* \* \* \* \*